(12) United States Patent
Li et al.

(10) Patent No.: US 12,216,804 B2
(45) Date of Patent: Feb. 4, 2025

(54) MACHINE LEARNING ATTACK RESISTANT STRONG PUF WITH DUAL-EDGE SAMPLING FUNCTION

(71) Applicant: Wenzhou University, Zhejiang (CN)

(72) Inventors: Gang Li, Zhejiang (CN); Hui Li, Zhejiang (CN); Pengjun Wang, Zhejiang (CN); Xilong Shao, Zhejiang (CN); Hao Ye, Zhejiang (CN)

(73) Assignee: Wenzhou University, Zhejiang (CN)

( * ) Notice: Subject to any disclaimer, the term of this patent is extended or adjusted under 35 U.S.C. 154(b) by 218 days.

(21) Appl. No.: 18/179,385

(22) Filed: Mar. 7, 2023

(65) Prior Publication Data

US 2024/0169100 A1 May 23, 2024

(30) Foreign Application Priority Data

Nov. 21, 2022 (CN) .......................... 202211453141.X

(51) Int. Cl.
*H04L 9/32* (2006.01)
*G06F 21/75* (2013.01)
(52) U.S. Cl.
CPC ............ *G06F 21/75* (2013.01); *H04L 9/3278* (2013.01)
(58) Field of Classification Search
CPC ................................ G06F 21/75; H04L 9/3278
See application file for complete search history.

(56) References Cited

U.S. PATENT DOCUMENTS

| | | | |
|---|---|---|---|
| 10,038,446 B2 * | 7/2018 | Mai | H03K 19/00315 |
| 2016/0373264 A1 * | 12/2016 | Katoh | H10N 70/24 |
| 2019/0132137 A1 * | 5/2019 | Zhong | H04L 9/3278 |

FOREIGN PATENT DOCUMENTS

| | | | | |
|---|---|---|---|---|
| CN | 108763977 A | * | 11/2018 | G06F 21/602 |
| CN | 114826622 A | * | 7/2022 | |

OTHER PUBLICATIONS

Jiahao Liu et al., "A 0.04% BER Strong PUF With Cell-Bias-Based CRPs Filtering and Background Offset Calibration," IEEE Transactionson Circuits and Systems-I: Regular Papers, vol. 67, Nov. 2020, pp. 3853-3865.

(Continued)

*Primary Examiner* — Michael R Vaughan
*Assistant Examiner* — Abdullah Almamun
(74) *Attorney, Agent, or Firm* — JCIPRNET

(57) ABSTRACT

A machine learning attack resistant strong PUF with a dual-edge sampling function comprises switch units, a first arbiter and a second arbiter. The first arbiter is for determining a sequential order of delays at a rising edge of signals input to a first input terminal and a second input terminal of the first arbiter. The second arbiter is for determining a sequential order of delays at a falling edge of signals input to a first input terminal and a second input terminal of the second arbiter. Each switch unit is composed of eight MOS transistors. The strong PUF has a high capacity to resist machine learning attacks and small hardware expenditure through simple structural design of the switch units, realizing machine learning attack resistance and small hardware expenditure at the same time, and generating a large number of challenge response pairs through dual-edge sampling realized by the two arbiters.

2 Claims, 8 Drawing Sheets

(56) References Cited

OTHER PUBLICATIONS

Abilash Venkatesh et al., "0.3 pJ/Bit Machine Learning Resistant Strong PUF Using Subthreshold Voltage Divider Array," IEEE Transactions on Circuits and Systems-II: Express Briefs, vol. 67, Aug. 2020, pp. 1394-1398.

Haoyu Zhuang et al., "A Strong Subthreshold Current Array PUF Resilient to Machine Learning Attacks," IEEE Transactions on Circuits and Systems-I: Regular Papers, vol. 67, Jan. 2020, pp. 135-144.

* cited by examiner

MACHINE LEARNING ATTACK RESISTANT STRONG PUF WITH DUAL-EDGE SAMPLING FUNCTION

CROSS-REFERENCE TO RELATED APPLICATION

This application claims the priority benefit of China application serial no. 202211453141.X, filed on Nov. 21, 2022. The entirety of the above-mentioned patent application is hereby incorporated by reference herein and made a part of this specification.

TECHNICAL FIELD

The invention relates to a delay-type strong PUF, in particular to a machine learning attack resistant strong PUF with a dual-edge sampling function.

DESCRIPTION OF RELATED ART

Physical unclonable functions (PUFs) can generate random, unique and tamper-proof intrinsic digital IDs by using random and intrinsic changes during the semiconductor manufacturing process as an entropy source, which provides a solution to security problems of low-cost and lightweight equipment.

The arbiter PUF (APUF) circuit, of which the structure is shown in FIG. 1, is one of the strong PUF circuits which are earliest proposed. According to the arbiter PUF, when a challenge signal $C_i$ is a low level, MOS transistors P1 and N1 in a selector are turned on, P2 and N2 are turned off, and an output terminal Out of the selector transmits a signal In0; on the contrary, when the challenge signal $C_i$ is a high level, the MOS transistor P1 and N1 in the selector are turned off, P2 and N2 are turned on, the output terminal Out of the selector transmits a signal In1. That is, when the challenge signal $C_i$ is a low level, output terminals Out0 and Out1 of the switch unit transmit signals In0 and In1 respectively; when the challenge signal $C_i$ is a high level, the output terminals Out0 and Out1 of the switch unit transmit signals In1 and In0 respectively. The arbiter PUF can transmit the same square signal to an arbiter along different transmission paths by means of challenge signals of different levels, then the arbiter measures delays of the two transmission paths to extract a process deviation of the circuit, and challenge response pairs (CRPs) can be obtained to be used for equipment authentication and encrypted transmission of information in resource-constrained IoT security equipment. However, with the development of machine learning, science researchers can perform modeling analysis on traditional PUFs through the machine learning algorithm to accurately predict output responses. Literature J. Liu, Y Zhu, C.-H Chan and R. P. Martins, "A 0.04% BER Strong PUF With Cell-Bias-Based CRPs Filtering and Background Offset Calibration," in IEEE Transactions on Circuits and Systems I: Regular Papers, vol. 67, no. 11, pp. 3853-3865, November 2020, proposed a subthreshold current array-based dynamic amplifier PUF unit, which has highly nonlinear sub-threshold characteristics and can effectively defend against machining learning attacks, but this dynamic amplifier PUF unit has the core area as large as 22400 $m^2$ when generating $1.8 \times 10^{19}$ groups of CRPs. Literature A. Venkatesh, A. B. Venkatasubramaniyan, X Xi and A. Sanyal, "0.3 pJ/Bit Machine Learning Resistant Strong PUF Using Subthreshold Voltage Divider Array," in IEEE Transactions on Circuits and Systems II: Express Briefs, vol. 67, no. 8, pp. 1394-1398, August 2020, proposed a strong PUF using subthreshold voltage dividers, of which the capacity to resist machine learning attacks is improved based on the nonlinear current-voltage relation of MOSs working within the threshold voltage area, but the area of the strong PUF reaches 2800 $m^2$ when the strong PUF generates $0.8 \times 10^{19}$ groups of CRPs. Literature H. Zhuang, X Xi, N. Sun, and M Orshansky, "A strong subthreshold current array PUF resilient to machine learning attacks," IEEE Trans. Circuits Syst. I, Reg. Papers, vol. 67, no. 1, pp. 135-144, January 2020, proposed a strong subthreshold current array PUF, which enables a circuit to have the capacity to resist machine learning attacks by means of the nonlinear current relation of PMOS transistors working in the subthreshold area, but the area of this strong PUF reaches 44400 $m^2$ when the strong PUF generates $3.7 \times 10^{19}$ groups of CRPs.

Although the capacity to resist machine learning attacks of the above-mentioned PUFs is improved, they have large hardware expenditure, cannot realize machine learning attack resistance and small hardware expenditure at the same time, and there is no obvious increase of the number of challenge response pairs generated by these strong PUFs.

BRIEF SUMMARY OF THE INVENTION

The technical issue to be settled by the invention is to provide a machine learning attack resistant strong PUF with a dual-edge sampling function, which has a high capacity to resist machine learning attacks, has small hardware expenditure, can realize machine learning attack resistance and small hardware expenditure at the same time, and can generate a large number of challenge response pairs.

The technical solution adopted by the invention to settle the above technical issue is as follows: a machine learning attack resistant strong PUF with a dual-edge sampling function comprises N switch units, wherein each switch unit has a first input terminal, a second input terminal, a control terminal, a first output terminal and a second output terminal; a challenge signal is input to the control terminal of each switch unit; each switch unit is able to transmit square signals input to the first input terminal and the second input terminal of this switch unit to the first output terminal and the second output terminal of this switch unit in parallel or in a crossed manner under the control of the challenge signal input to the control terminal of this switch unit and output the square signals by the first output terminal and the second output terminal of this switch unit; the first output terminal of the $n^{th}$ switch unit is connected to the first input terminal of the $(n+1)^{th}$ switch unit, the second output terminal of the $n^{th}$ switch unit is connected to the second input terminal of the $(n+1)^{th}$ switch unit, and n=1, 2, . . . , N−1; the machine learning attack resistant strong PUF with a dual-edge sampling function further comprises two arbiters, which are referred to as a first arbiter and a second arbiter respectively, the first arbiter and the second arbiter each have a first input terminal, a second input terminal and an output terminal, the first output terminal of the $N^{th}$ switch unit is connected to the first input terminal of the first arbiter and the first input terminal of the second arbiter, the second output terminal of the $N^{th}$ switch unit is connected to the second input terminal of the first arbiter and the second input terminal of the second arbiter, the first arbiter is used for determining a sequential order of delays at a rising edge of signals input to the first input terminal and the second input terminal of the first arbiter and generating a corresponding signal which is output by the output terminal of the first arbiter, and the second arbiter is used for determining a sequential order of delays at a falling edge of signals input to the first input terminal and the second input terminal of the second arbiter and generating a corresponding signal which is output by the output terminal of the second arbiter; each switch unit comprises a first PMOS transistor, a second PMOS transistor, a third PMOS transistor, a fourth PMOS transistor, a fifth PMOS transistor, a sixth PMOS transistor, a seventh PMOS transistor, an eighth PMOS transistor, a first NMOS transistor, a second NMOS transistor, a third NMOS transistor, a fourth NMOS transistor, a fifth NMOS transistor, a sixth NMOS transistor, a seventh NMOS transistor and an eighth NMOS transistor, wherein a gate of the first PMOS transistor and a gate of the first NMOS transistor are connected, and a connecting terminal is the first input terminal In0 of the switch unit; a supply voltage VDD is accessed to a source of the first PMOS transistor, a source of the fourth PMOS transistor, a source of the fifth PMOS transistor and a source of the eighth PMOS transistor; a drain of the first PMOS transistor, a drain of the first NMOS transistor, a gate of the second PMOS transistor, a source of the second PMOS transistor, a gate of the second NMOS transistor and a source of the second NMOS transistor are connected; a drain of the second PMOS transistor, a drain of the second NMOS transistor, a source of the third PMOS transistor and a source of the third NMOS transistor are connected; a gate of the third PMOS transistor, a gate of the third NMOS transistor, a gate of the seventh PMOS transistor and a gate of the seventh NMOS transistor are connected, and a connecting terminal is the control terminal $C_i$ of the switch unit; a drain of the third PMOS transistor, a drain of the seventh NMOS transistor, a gate of the fourth PMOS transistor and a gate of the fourth NMOS transistor are connected; a drain of the third NMOS transistor, a drain of the seventh PMOS transistor, a gate of the eighth NMOS transistor and a gate of the eighth PMOS transistor are connected; a drain of the fourth PMOS transistor and a drain of the fourth NMOS transistor are connected, and a connecting terminal is the first output terminal Out0 of the switch unit; a source of the first NMOS transistor, a source of the fourth NMOS transistor, a source of the fifth NMOS transistor and a source of the eighth NMOS transistor are all grounded; a gate of the fifth PMOS transistor and a gate of the fifth NMOS transistor are connected, and a connecting terminal is the second input terminal In1 of the switch unit; a drain of the fifth PMOS transistor, a drain of the fifth NMOS transistor, a gate of the sixth PMOS transistor, a drain of the sixth PMOS transistor, a gate of the sixth NMOS transistor and a source of the sixth NMOS transistor are connected; a drain of the sixth PMOS transistor, a drain of the sixth NMOS transistor, a source of the seventh PMOS transistor and a source of the seventh NMOS transistor are connected; and a drain of the eighth PMOS transistor and a drain of the eighth NMOS transistor are connected, and a connecting terminal is the second output terminal Out1 of the switch unit.

The first arbiter comprises a first two-input NAND gate and a second two-input NAND gate, wherein the two-input NAND gate and the second two-input NAND gate each have a first input terminal, a second input terminal and an output terminal; the first input terminal of the first two-input NAND gate is the first input terminal of the first arbiter, the output terminal of the first two-input NAND gate is connected to the first input terminal of the second two-input NAND gate, the second input terminal of the second two-input NAND gate is the second input terminal of the first arbiter, the second input terminal of the first two-input NAND gate is connected to the output terminal of the second two-input NAND gate, and a connecting terminal is the output terminal of the second arbiter; the second arbiter comprises a first two-input NOR gate and a second two-input NOR gate, wherein the first two-input NOR gate and the second two-input NOR gate each have a first input terminal, a second input terminal and an output terminal, the first input terminal of the first two-input NOR gate is the first input terminal of the second arbiter, the output terminal of the first two-input NOR gate is connected to the first input terminal of the second two-input NOR gate, the second input terminal of the second two-input NOR gate is the second input terminal of the second arbiter, and the second input terminal of the first two-input NOR gate is connected to the output terminal of the second two-input NOR gate, and a connecting terminal is the output terminal of the second arbiter.

BRIEF DESCRIPTION OF THE SEVERAL VIEWS OF DRAWINGS

FIG. 8(*b*) illustrates a gray-scale map (64×128) of output responses at a falling edge of the machine learning attack resistant strong PUF with a dual-edge sampling function according to the invention;

FIG. 8(*c*) illustrates an average gray-scale map of output responses at the rising edge of the machine learning attack resistant strong PUF with a dual-edge sampling function according to the invention;

FIG. 8(*d*) illustrates an average gray-scale map of output responses at the falling edge of the machine learning attack resistant strong PUF with a dual-edge sampling function according to the invention;

DETAILED DESCRIPTION OF THE INVENTION

The invention will be described in further detail below in conjunction with accompanying drawings and embodiments.

Figure 2:
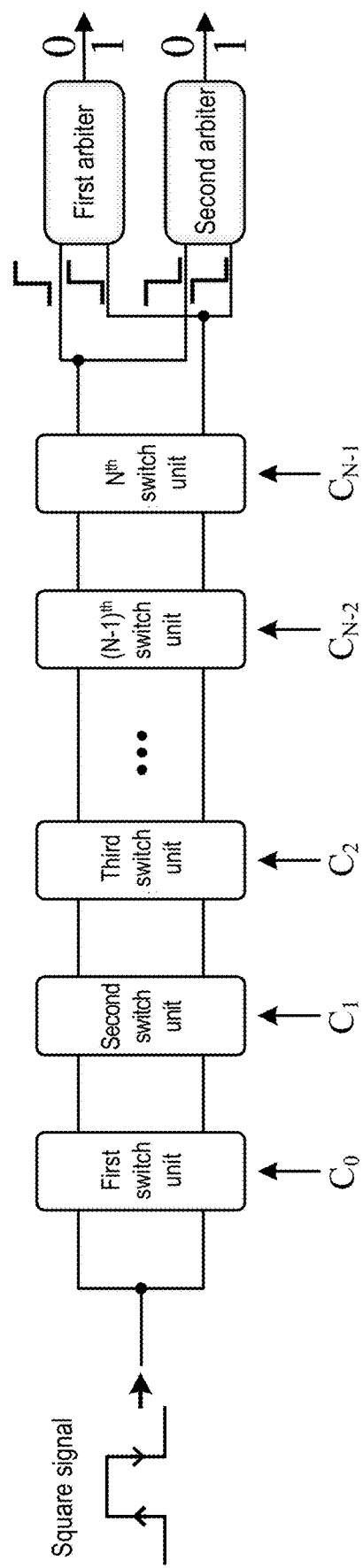
FIG. 2 is a structural diagram of a machine learning attack resistant strong PUF with a dual-edge sampling function according to the invention.
Figure 3:
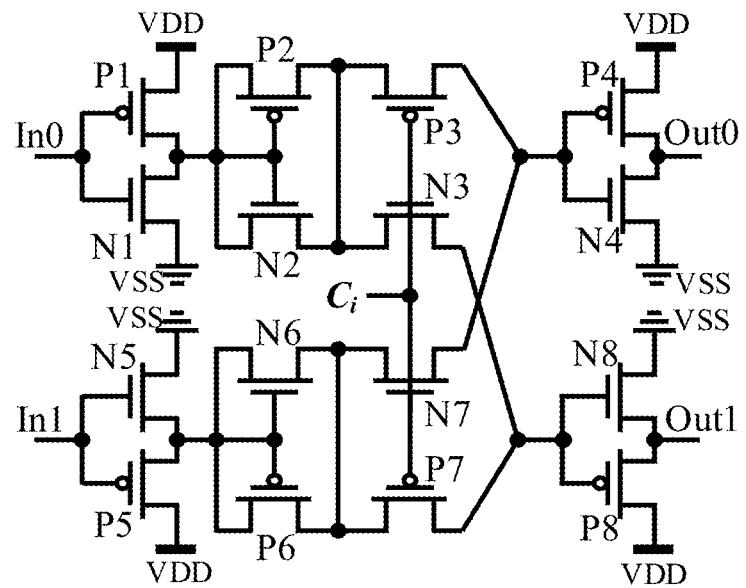
FIG. 3 is a circuit diagram of switch units of the machine learning attack resistant strong PUF with a dual-edge sampling function according to the invention.

Embodiment: As shown in FIG. 2, a machine learning attack resistant strong PUF with a dual-edge sampling function comprises N switch units, wherein each switch unit has a first input terminal, a second input terminal, a control terminal, a first output terminal and a second output terminal; a challenge signal is input to the control terminal of each switch unit; each switch unit is able to transmit square signals input to the first input terminal and the second input terminal of this switch unit to the first output terminal and the second output terminal of this switch unit in parallel or in a crossed manner under the control of the challenge signal input to the control terminal of this switch unit and output the square signals by the first output terminal and the second output terminal of this switch unit; the first output terminal of the $n^{th}$ switch unit is connected to the first input terminal of the $(n+1)^{th}$ switch unit, the second output terminal of the $n^{th}$ switch unit is connected to the second input terminal of the $(n+1)^{th}$ switch unit, and n=1, 2, ..., N−1; the machine learning attack resistant strong PUF with a dual-edge sampling function further comprises two arbiters, which are referred to as a first arbiter and a second arbiter respectively, the first arbiter and the second arbiter each have a first input terminal, a second input terminal and an output terminal, the first output terminal of the $N^{th}$ switch unit is connected to the first input terminal of the first arbiter and the first input terminal of the second arbiter, the second output terminal of the $N^{th}$ switch unit is connected to the second input terminal of the first arbiter and the second input terminal of the second arbiter, the first arbiter is used for determining a sequential order of delays at a rising edge of signals input to the first input terminal and the second input terminal of the first arbiter and generating a corresponding signal which is output by the output terminal of the first arbiter, and the second arbiter is used for determining a sequential order of delays at a falling edge of signals input to the first input terminal and the second input terminal of the second arbiter and generating a corresponding signal which is output by the output terminal of the second arbiter; as shown in FIG. 3, each switch unit comprises a first PMOS transistor P1, a second PMOS transistor P2, a third PMOS transistor P3, a fourth PMOS transistor P4, a fifth PMOS transistor P5, a sixth PMOS transistor P6, a seventh PMOS transistor P7, an eighth PMOS transistor P8, a first NMOS transistor N1, a second NMOS transistor N2, a third NMOS transistor N3, a fourth NMOS transistor N4, a fifth NMOS transistor N5, a sixth NMOS transistor N6, a seventh NMOS transistor N7 and an eighth NMOS transistor N8, wherein a gate of the first PMOS transistor P1 and a gate of the first NMOS transistor N1 are connected, and a connecting terminal is the first input terminal In0 of the switch unit; a supply voltage VDD is accessed to a source of the first PMOS transistor P1, a source of the fourth PMOS transistor P4, a source of the fifth PMOS transistor P5 and a source of the eighth PMOS transistor P8; a drain of the first PMOS transistor P1, a drain of the first NMOS transistor N1, a gate of the second PMOS transistor P2, a source of the second PMOS transistor P2, a gate of the second NMOS transistor N2 and a source of the second NMOS transistor N2 are connected; a drain of the second PMOS transistor P2, a drain of the second NMOS transistor N2, a source of the third PMOS transistor P3 and a source of the third NMOS transistor N3 are connected; a gate of the third PMOS transistor P3, a gate of the third NMOS transistor N3, a gate of the seventh PMOS transistor P7 and a gate of the seventh NMOS transistor N7 are connected, and a connecting terminal is the control terminal $C_i$ of the switch unit; a drain of the third PMOS transistor P3, a drain of the seventh NMOS transistor N7, a gate of the fourth PMOS transistor P4 and a gate of the fourth NMOS transistor N4 are connected; a drain of the third NMOS transistor N3, a drain of the seventh PMOS transistor P7, a gate of the eighth NMOS transistor N8 and a gate of the eighth PMOS transistor P8 are connected; a drain of the fourth PMOS transistor P4 and a drain of the fourth NMOS transistor N4 are connected, and a connecting terminal is the first output terminal Out0 of the switch unit; a source of the first NMOS transistor N1, a source of the fourth NMOS transistor N4, a source of the fifth NMOS transistor N5 and a source of the eighth NMOS transistor N8 are all grounded; a gate of the fifth PMOS transistor P5 and a gate of the fifth NMOS transistor N5 are connected, and a connecting terminal is the second input terminal In1 of the switch unit; a drain of the fifth PMOS transistor P5, a drain of the fifth NMOS transistor N5, a gate of the sixth PMOS transistor P6, a drain of the sixth PMOS transistor P6, a gate of the sixth NMOS transistor N6 and a source of the sixth NMOS transistor N6 are connected; a drain of the sixth PMOS transistor P6, a drain of the sixth NMOS transistor N6, a source of the seventh PMOS transistor P7 and a source of the seventh NMOS transistor N7 are connected; and a drain of the eighth PMOS transistor P8 and a drain of the eighth NMOS transistor N8 are connected, and a connecting terminal is the second output terminal Out1 of the switch unit.

Figure 4:
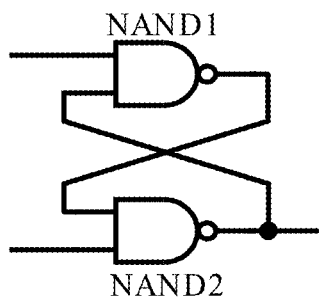
FIG. 4 is a circuit diagram of a first arbiter of the machine learning attack resistant strong PUF with a dual-edge sampling function according to the invention.
Figure 5:
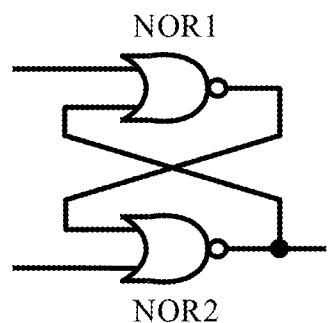
FIG. 5 is a circuit diagram of a second arbiter of the machine learning attack resistant strong PUF with a dual-edge sampling function according to the invention.

As shown in FIG. 4 and FIG. 5, in this embodiment, the first arbiter comprises a first two-input NAND gate NAND1 and a second two-input NAND gate NAND2, wherein the two-input NAND gate NAND1 and the second two-input NAND gate NAND2 each have a first input terminal, a second input terminal and an output terminal; the first input terminal of the first two-input NAND gate NAND1 is the first input terminal of the first arbiter, the output terminal of the first two-input NAND gate NAND1 is connected to the first input terminal of the second two-input NAND gate NAND2, the second input terminal of the second two-input NAND gate NAND2 is the second input terminal of the first arbiter, the second input terminal of the first two-input NAND gate NAND1 is connected to the output terminal of the second two-input NAND gate NAND2, and a connecting terminal is the output terminal of the second arbiter; the second arbiter comprises a first two-input NOR gate NOR1 and a second two-input NOR gate NOR2, wherein the first two-input NOR gate NOR1 and the second two-input NOR gate NOR2 each have a first input terminal, a second input terminal and an output terminal, the first input terminal of the first two-input NOR gate NOR1 is the first input terminal of the second arbiter, the output terminal of the first two-input NOR gate NOR1 is connected to the first input terminal of the second two-input NOR gate NOR2, the second input terminal of the second two-input NOR gate NOR2 is the second input terminal of the second arbiter, and the second input terminal of the first two-input NOR gate NOR1 is connected to the output terminal of the second two-input NOR gate NOR2, and a connecting terminal is the output terminal of the second arbiter.

According to the machine learning attack resistant strong PUF with a dual-edge sampling function, under the action of the challenge signal input to the control terminal of each switch unit, square signals input to the first input terminal and the second input terminal of the switch unit will be transmitted in the switch unit in parallel or in a crossed manner to the first output terminal and the second output terminal of the switch unit and are then output by the first output terminal and the second output terminal. When a square signal is input to the first input terminal In0 of the switch unit, the square signal input to the first input terminal In0 of the switch unit is inverted and shaped by an inverter formed by the first PMOS transistor P1 and the first NMOS transistor N1 to ensure that the square signal has a short rise time and a short fall time before reaching a delay unit formed by the second PMOS transistor P2 and the second NMOS transistor N2; because the gates and sources of the second PMOS transistor P2 and the second NMOS transistor N2 form input terminals of the delay unit, the second PMOS transistor P2 will be turned on and the second NMOS transistor N2 will be turned off when the square signal reaching the input terminals of the delay unit is a low level; because a threshold loss will be caused when the PMOS transistor transmits a low level, an output terminal of the delay unit, formed by the drains of the second PMOS transistor P2 and the second NMOS transistor N2, cannot be quickly pulled down to a low level (VSS) and can only be pulled down to a threshold voltage of the second PMOS transistor P2; due to process deviations, the second PMOS transistor P2 in each switch unit has a different threshold voltage, which makes the output terminal of the delay unit formed by the drains of the second PMOS transistor P2 and the second NMOS transistor N2 in each switch unit be pulled down to a different level (voltage), finally leading to a different delay of the square signal in each switch unit; similarly, when the square signal reaching the input terminals of the delay unit is a high level, the second NMOS transistor N2 will be turned on, the second PMOS transistor P2 will be turned off, because a threshold loss will be caused when the NMOS transistor transmits a high level, the output terminal of the delay unit, formed by the drains of the second PMOS transistor P2 and the second NMOS transistor N2, cannot be quickly pulled up to a high level (supply voltage VDD) and can only be pulled up to a voltage obtained by subtracting a threshold voltage of the second NMOS transistor N2 from the supply voltage VDD; because of inevitable process deviations during the manufacturing process, the NMOS transistors have different threshold voltages, which makes the second NMOS transistor N2 in each switch unit have a different threshold voltage and the output terminal of the delay unit in each switch unit, formed by the drains of the second MPOS transistor P2 and the second NMOS transistor N2, be pulled down to a different level (voltage), thus leading to a different delay of the square signal in each switch unit; then, the square signal output by the output terminal of the delay unit, formed by the drains of the second PMOS transistor P2 and the second NMOS transistor N2, is transmitted by the third PMOS transistor P3 and the third NMOS transistor N3; when the challenge signal input to the control terminal meets $C_i=0$, the third PMOS transistor P3 is turned on, the third NMOS transistor N3 is turned off, the square signal is transmitted to an input terminal of an inverter formed by the fourth PMOS transistor P4 and the fourth NMOS transistor N4 through the third PMOS transistor P3 and is inverted again by the inverter formed by the fourth PMOS transistor P4 and the fourth NMOS transistor N4, and finally, a square signal identical with the square signal input to the first input terminal In0 is output by the first output terminal Out0 of the switch unit.

On the contrary, when the challenge signal input to the control terminal meets $C_i=1$, the third PMOS transistor P3 is turned off, the third NMOS transistor N3 is turned on, the square signal is transmitted to an input terminal of an inverter formed by the eighth PMOS transistor P8 and the eighth NMOS transistor N8 through the third NMOS transistor N3 and is inverted again by the inverter formed by the eighth PMOS transistor P8 and the eighth NMOS transistor N8, and a square signal identical with the square signal input to the first input terminal In0 is output by the second output terminal Out1 of the switch unit. When a square signal is input to the second input terminal In1 of the switch unit, the square signal input to the second input terminal In1 of the switch unit is inverted and shaped by an inverter formed by the fifth PMOS transistor P5 and the fifth NMOS transistor N5 to ensure that the square signal has a short rise time and a short fall time before reaching a delay unit formed by the sixth PMOS transistor P6 and the sixth NMOS transistor N6; because the gates and sources of the sixth PMOS transistor P6 and the sixth NMOS transistor N6 form input terminals of the delay unit, the sixth PMOS transistor P6 will be turned on and the sixth NMOS transistor N6 will be turned off when the square signal reaching the input terminals of the delay unit is a low level; because a threshold loss will be caused when the PMOS transistor transmits a low level, an output terminal of the delay unit, formed by the drains of the sixth PMOS transistor P6 and the sixth NMOS transistor N6, cannot be quickly pulled down to a low level (VSS) and can only be pulled down to a threshold voltage of the sixth PMOS transistor P6; due to the process deviations, the sixth PMOS transistor P6 in each switch unit has a different threshold voltage, which makes the output terminal of the delay unit formed by the drains of the sixth PMOS transistor P6 and the sixth NMOS transistor N6 in each switch unit be pulled down to a different level (voltage), finally leading to a different delay of the square signal in each switch unit; similarly, when the square signal reaching the input terminals of the delay unit is a high level, the sixth NMOS transistor N6 will be turned on, the sixth PMOS transistor P6 will be turned off; because a threshold loss will be caused when the NMOS transistor transmits a high level, the output terminal of the delay unit, formed by the drains of the sixth PMOS transistor P6 and the sixth NMOS transistor N6, cannot be quickly pulled up to a high level (supply voltage VDD) and can only be pulled up to a voltage obtained by subtracting a threshold voltage of the sixth NMOS transistor N6 from the supply voltage VDD. Because of inevitable process deviations during the manufacturing process, NMOS transistors have different threshold voltages, and the sixth NMOS transistor N6 in each switch unit has a different threshold voltage, which makes the output terminal of the delay unit in each switch unit, formed by the drains of the sixth MPOS transistor P6 and the sixth NMOS transistor N6, be pulled down to a different voltage, thus leading to a different delay of the square signal in each switch unit; then, the square signal output by the output terminal of the delay unit, formed by the drains of the sixth PMOS transistor P6 and the sixth NMOS transistor N6, is transmitted by the seventh PMOS transistor P7 and the seventh NMOS transistor N7; when the challenge signal input to the control terminal meets $C_i=0$, the seventh PMOS transistor P7 is turned on, the seventh NMOS transistor N7 is turned off, the square signal is transmitted to an input terminal of an inverter formed by the eighth PMOS transistor P8 and the eighth NMOS transistor N8 through the seventh PMOS transistor P7 and is inverted again by the inverter formed by the eighth PMOS transistor P8 and the eighth NMOS transistor N8, and a square signal identical with the square signal input to the second input terminal In1 is output by the first output terminal Out0 of the switch unit. On the contrary, when the challenge signal input to the control terminal meets $C_i=1$, the seventh PMOS transistor P7 is turned off, the seventh NMOS transistor N7 is turned on, the square signal is transmitted to an input terminal of an inverter formed by the fourth PMOS transistor P4 and the fourth NMOS transistor N4 through the seventh NMOS transistor N7 and is inverted again by the inverter formed by the fourth PMOS transistor P4 and the fourth NMOS transistor N4, and a square signal identical with the square signal input to the second input terminal In1 is output by the first output terminal Out0 of the switch unit.

According to the machine learning attack resistant strong PUF with a dual-edge sampling function in this embodiment, when the first output terminal and the second output terminal of the $N^{th}$ switch unit output two paths of square signals, the first arbiter and the second arbiter determine delay deviations of the first output terminal Out0 and the second output terminal Out1 of the $N^{th}$ switch unit. When the two paths of square signals enter the first arbiter, the first arbiter is an RS flip-flop formed by two NAND gates; when the two paths of square signals input to the first input terminal and the second input terminal of the first arbiter are low levels, the output terminal of the first arbiter outputs a high level; when one of the two paths of square signals input to the first input terminal and the second input terminal of the first arbiter jumps into a high level before the other, the first arbiter will make a different determination; when the upper path of signal (the square signal input to the first input terminal of the first arbiter) jumps into a high level first, the output terminal of the first arbiter outputs a high level; when the lower path of signal (the square signal input to the second input terminal of the first arbiter) jumps into a high level first, the output terminal of the first arbiter outputs a low level; and finally, when the lagged path of signal jumps, the two paths of input signals are both high levels, the signal output by the output terminal of the first arbiter will not jump, and thus, the signal output by the output terminal of the first arbiter remains unchanged. That is, when the square signals pass through the first arbiter, a sequential order of delays at a rising edge of the square signals input to the first arbiter is determined. When the two paths of square signals output by the first output terminal and the second output terminal of the $N^{th}$ switch unit enter the second arbiter, the second arbiter is an RS flip-flop formed by two NOR gates; when the two paths of square signals are high levels, the output terminal of the second arbiter outputs a low level; when the upper path of signal (the square signal input to the first input terminal of the second arbiter) jumps into a low level first, the output terminal of the second arbiter still outputs a low level; when the lower path of signal (the square signal input to the second input terminal of the second arbiter) jumps into a low level first, the output terminal of the second arbiter outputs a high level; and similarly, when the lagged path of signal jumps into a low level, the signal output by the output terminal of the second arbiter still remains unchanged. That is, the second arbiter can determine a sequential order of delays at a falling edge of the square signals input to the second arbiter. In this way, challenge response pairs at the rising edge and the falling edge of the PUF circuit can be extracted to realize dual-edge sampling, and the PUF circuit finishes working. Compared with traditional APUF circuits adopting one arbiter, the number of challenge response pairs can be multiplied.

Figure 6:
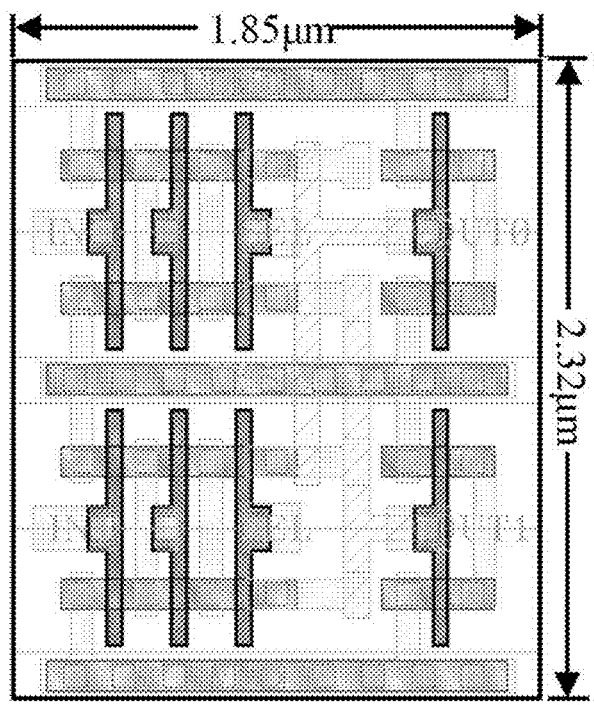
FIG. 6 illustrates the layout of the switch units of the machine learning attack resistant strong PUF with a dual-edge sampling function according to the invention.

As shown in FIG. 6 which illustrates the layout of the switch units of the machine learning attack resistant strong PUF with a dual-edge sampling function provided by the invention, when the number of the switch units is 64, the area of the machine learning attack resistant strong PUF with a dual-edge sampling function is merely 289 m$^2$, and the number of CRPs reaches $3.7\times10^{19}$, which indicates that the machine learning attack resistant strong PUF with a dual-edge sampling function provided by the invention can generate a large number of CRPs under the condition of a small area.

Figure 1:
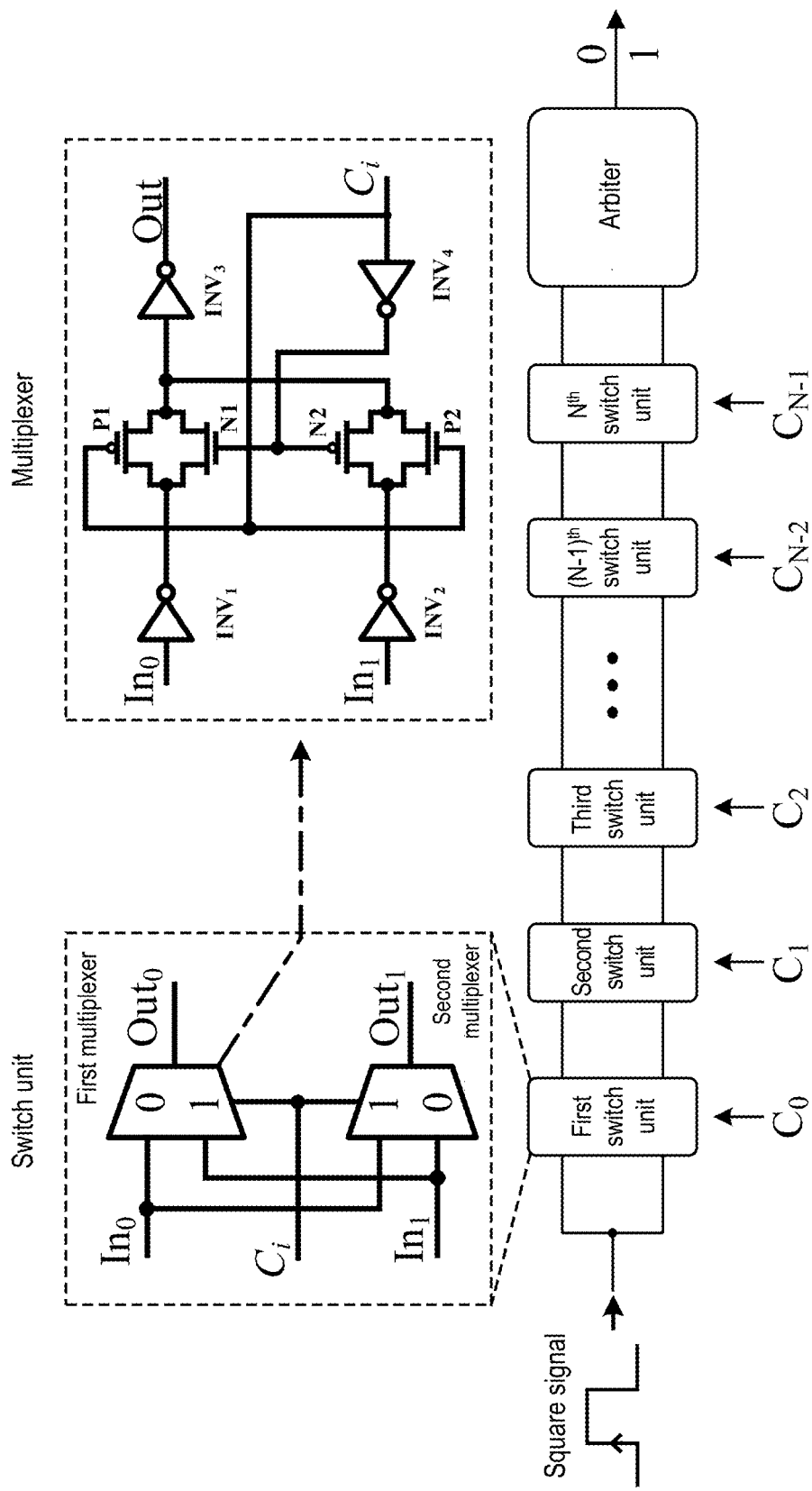
FIG. 1 is a structural diagram of a traditional arbiter PUF.
Figure 7:
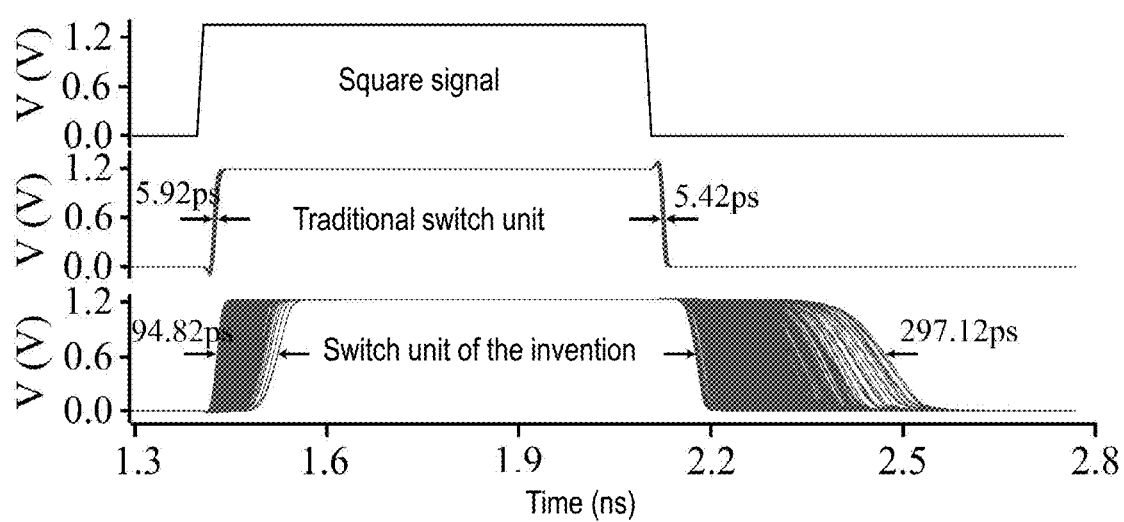
FIG. 7 illustrates an oscillogram obtained by performing 1,000 Monte Carlo simulations on the switch units of the machine learning attack resistant strong PUF with a dual-edge sampling function according to the invention and switch units of the traditional arbiter PUF.

The same square signal is input to the switch units of the traditional strong PUF shown in FIG. 1 and the switch units of the machine learning attack resistant strong PUF with a dual-edge sampling function provided by the invention, then 1,000 Monte Carlo simulations are performed, and an oscillogram obtained by performing 1,000 Monte Carlo simulations on the switch units of the machine learning attack resistant strong PUF with a dual-edge sampling function provided by the invention and the switch units of the traditional arbiter PUF is shown in FIG. 7. It can be known, by analyzing FIG. 7, that the switch units of the machine learning attack resistant strong PUF with a dual-edge sampling function provided by the invention have greater delay deviations and longer rise and fall times at the rising edge and the falling edge, so the stability of output responses of the machine learning attack resistant strong PUF with a dual-edge sampling function provided by the invention is improved.

Figure 8A:
FIG. 8(*a*) illustrates a gray-scale map (64×128) of output responses at a rising edge of the machine learning attack resistant strong PUF with a dual-edge sampling function according to the invention.
Figure 8B:
Figure 8C:
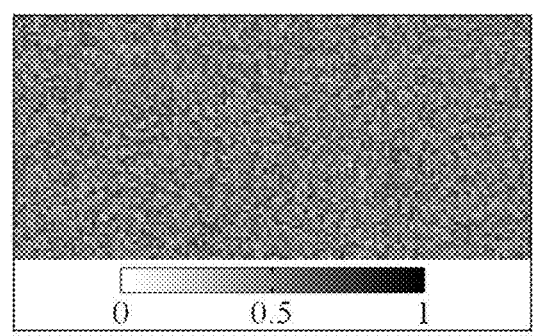
Figure 8D:
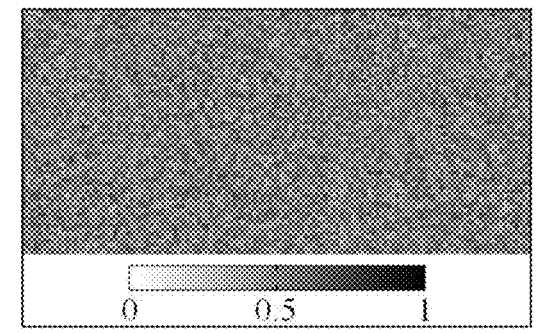

The randomness of the PUF can be visually observed through gray-scale maps, in which the black pixel indicates that an extracted response is logic "1" and the white pixel indicates that an extracted response is logic '0'. Multiple Monte Carlo simulations are performed on the machine learning attack resistant strong PUF with a dual-edge sampling function provided by the invention to obtain multiple Monte Carlo simulation diagrams, and the gray-scale maps of 8,192 responses at a rising edge and a falling edge randomly selected from these Monte Carlo simulation diagrams are shown in FIG. 8(a) and FIG. 8(b). It can be known, by analyzing FIG. (a), that the probability of logic "1" at the rising edge of the machine learning attack resistant strong PUF with a dual-edge sampling function provided by the invention is 50.15%. It can be known, by analyzing FIG. 8(b), that the probability of logic "1", at the falling edge of the machine learning attack resistant strong PUF with a dual-edge sampling function provided by the invention is 50.03%, which is extremely close to a desired value (50%). The average gray-scale map is obtained by superposing and averaging all gray-scale maps obtained after simulations. 39 Monte Carlo simulations are performed on the machine learning attack resistant strong PUF with a dual-edge sampling function provided by the invention, and average gray-scale maps of the 8,192 responses at both edges after 39 Monte Carlo simulations are obtained. The average gray-scale map of the output responses at the rising edge of the machine learning attack resistant strong PUF with a dual-edge sampling function provided by the invention is shown in FIG. 8(c), and the average gray-scale map of the output responses at the falling edge of the machine learning attack resistant strong PUF with a dual-edge sampling function provided by the invention is shown in FIG. 8(d). It can be known, by analyzing FIG. 8(c) and FIG. 8(d), that the gray-scale values of the output responses at the rising edge and the falling edge of the machine learning attack resistant strong PUF with a dual-edge sampling function provided by the invention are close to 50%, and there is no obvious spatial sparkle, which indicates that the machine learning attack resistant strong PUF with a dual-edge sampling function provided by the invention has good randomness.

Figure 9:
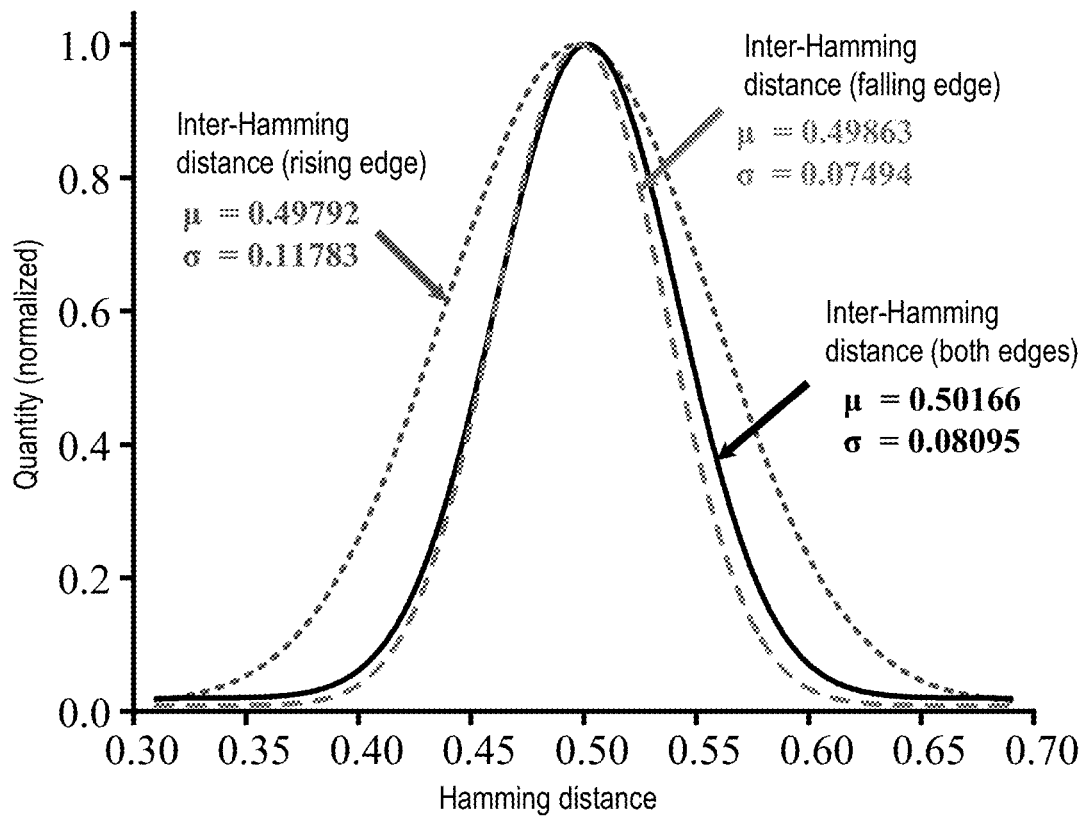
FIG. 9 illustrates a test graph of the inter-Hamming distance of the machine learning attack resistant strong PUF with a dual-edge sampling function according to the invention.

39 Monte Carlo simulations are performed on the machine learning attack resistant strong PUF with a dual-edge sampling function provided by the invention, responses of square signals at the rising edge and the falling edge are extracted, and the inter-Hamming distance between the responses at the rising edge, the inter-Hamming distance between the responses at the falling edge and the inter-Hamming distance between the mixed responses are tested respectively and are shown in FIG. 9. It can be known, by analyzing FIG. 9, that the inter-Hamming distances at the rising edge and the falling edge of any two PUFs are 49.863% and 49.793% respectively, and the average inter-Hamming distance of the PUFs after responses at the two edges are mixed is 50.166%, which is close to 50%, indicating that the two machine learning attack resistant strong PUFs are mutually independent and responses extracted from the rising edge and the falling edge of the same machine learning attack resistant strong PUF are mutually independent and can be used as unique CRPs for equipment authentication and other security measures.

Figure 10:
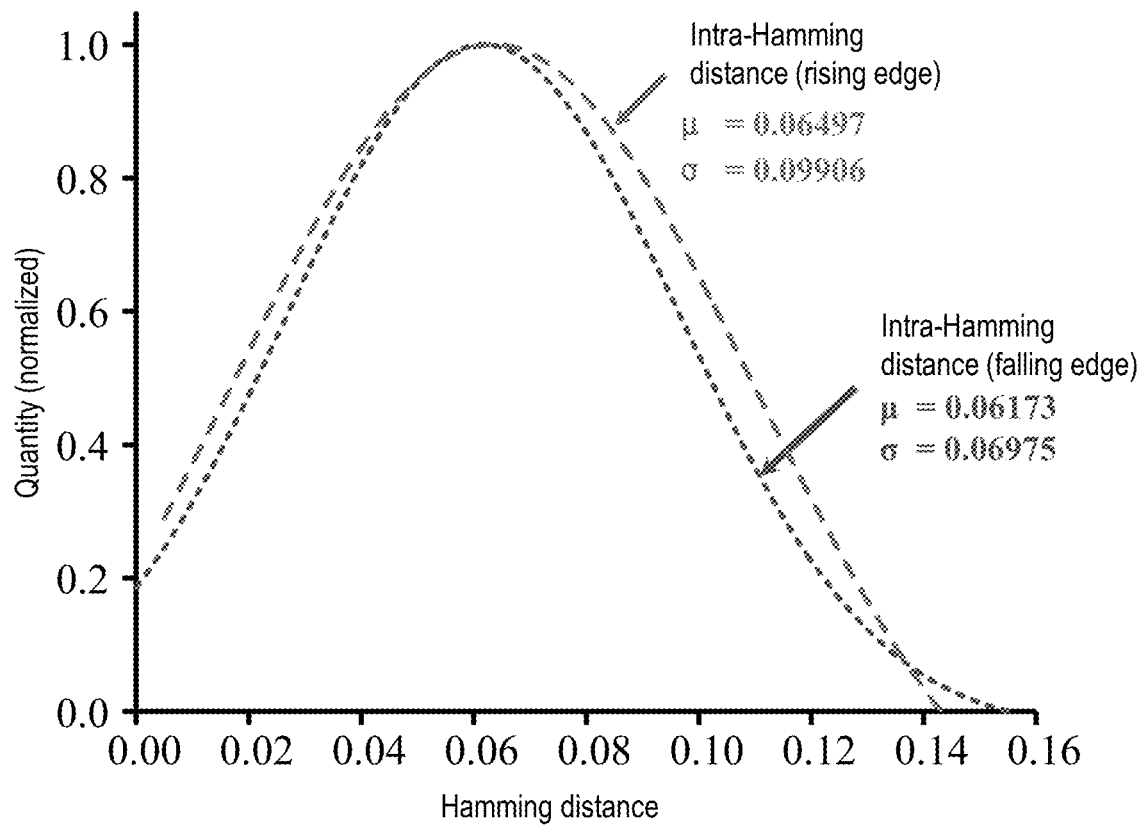
FIG. 10 illustrates a test graph of the intra-Hamming distance of the machine learning attack resistant strong PUF with a dual-edge sampling function according to the invention.

The operating temperature of the machine learning attack resistant strong PUF with a dual-edge sampling function provided by the invention is changed to enable the machine learning attack resistant strong PUF to operate between −10° C. and 100° C. The supply voltage VDD is adjusted to enable the machine learning attack resistant strong PUF with a dual-edge sampling function provided by the invention to operate normally between 1.075V and 1.25V. The Hamming distances between responses of the strong PUF under a standard condition (operating voltage 1.2V and ambient temperature 27° C.) and under different operating conditions are measured and shown in FIG. 10. It can be known, by analyzing FIG. 10, that in the simulation curve of the square signals at the rising edge, the intra-Hamming distance is 0.06173, which is close to a desired value 0, that is, the stability is about 94%; and in the simulation curve of the square signals at the falling edge, the intra-Hamming distance is 0.06494, that is, the stability is 93.5%. The tests prove that the machine learning attack resistant strong PUF with a dual-edge sampling function provided by the invention has good stability both at the rising edge and the falling edge.

Figure 11:
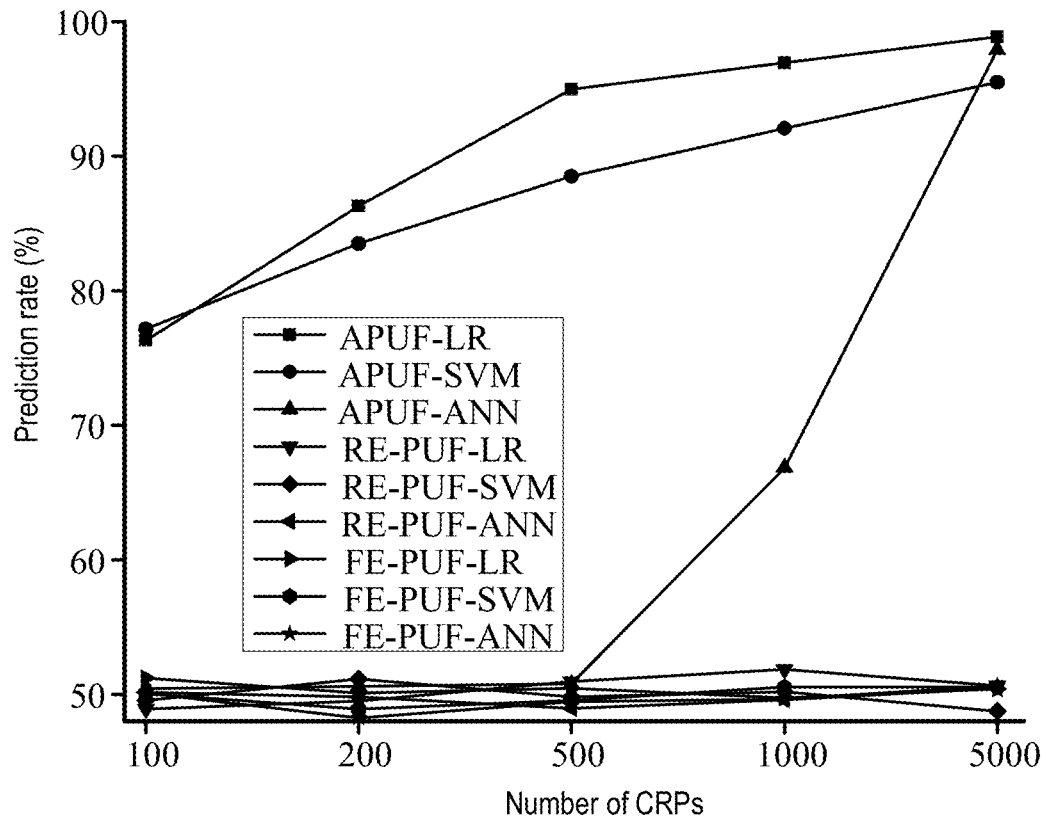
FIG. 11 illustrates a curve chart of the prediction rate of machine learning attacks of the machine learning attack resistant strong PUF with a dual-edge sampling function according to the invention and several existing strong PUFs.

Common machine learning attacks on PUF circuits include logistic regression (LR), support vector machine (SVN) and artificial neural network (ANN), which model an actual PUF circuit by learning and training CRPs of the PUF circuit, so as to predict a key generated by the PUF circuit. To verify the machine learning resistance of the machine learning attack resistant strong PUF with a dual-edge sampling function provided by the invention, the machine learning attack resistant strong PUF with a dual-edge sampling function provided by the invention and a traditional APUF are tested, and test results obtained by testing 100 to 5,000 CRPs are shown in FIG. 11. In FIG. 11, APUF-LR is a prediction result chart obtained by attacking the APUF with LR, APUF-SVM is a prediction result chart obtained by attacking the APUF with SVN, APUF-ANN is a prediction result chart obtained by attacking the APUF with ANN, RE-PUF-LR is a prediction result chart at the rising edge obtained by attacking the machine learning attack resistant strong PUF with a dual-edge sampling function provided by the invention with LR, FE-PUF-LR is a prediction result chart at the falling edge obtained by attacking the machine learning attack resistant strong PUF with a dual-edge sampling function provided by the invention with LR, RE-PUF-SVM is a prediction result chart at the rising edge obtained by attacking the machine learning attack resistant strong PUF with a dual-edge sampling function provided by the invention with SVM, FE-PUF-SVM is a prediction result chart at the falling edge obtained by attacking the machine learning attack resistant strong PUF with a dual-edge sampling function provided by the invention with SVM, RE-PUF-ANN is a prediction result chart at the rising edge obtained by attacking the machine learning attack resistant strong PUF with a dual-edge sampling function provided by the invention with ANN, and FE-PUF-ANN is a prediction result chart at the falling edge obtained by attacking the machine learning attack resistant strong PUF with a dual-edge sampling function provided by the invention with ANN. It can be known, by analyzing FIG. 11, that when the machine learning resistance of the traditional APUF is tested, the prediction rates of LR, SVM and ANN are 96.95%, 95.50% and 97.93% respectively in case of a training set including 5,000 CRPs, which indicates that the traditional APUF can be easily modeled by machine learning attacks. When the machine learning attack resistance tests are performed on CRPs at the rising edge (RE) and CRPs at the falling edge (FE) of the machine learning attack resistant strong PUF with a dual-edge sampling function provided by the invention, the prediction rates of LR, SVM and ANN at the rising edge are 52.65%, 48.75% and 50.45% respectively, and the prediction rates of LR, SVM and ANN at the rising edge are 50.40%, 50.55% and 50.65% respectively. Thus, compared with the traditional APUF, the machine learning attack resistance of the machine learning attack resistant strong PUF with a dual-edge sampling function provided by the invention is remarkably improved.

Compared with the prior art, the invention has the following beneficial effects: the first arbiter and the second arbiter are set, the first arbiter is used for determining a sequential order of delays at a rising edge of signals input to the first input terminal and the second input terminal of the first arbiter, generating a corresponding signal and outputting the corresponding signal by the output terminal of the first arbiter, and the second arbiter is used for determining a sequential order of delays at a falling edge of signals input to the first input terminal and the second input terminal of the second arbiter, generating a corresponding signal and outputting the corresponding signal by the output terminal of the second arbiter; each switch unit is composed of the first PMOS transistor, the second PMOS transistor, the third PMOS transistor, the fourth PMOS transistor, the fifth PMOS transistor, the sixth PMOS transistor, the seventh PMOS transistor, the eighth PMOS transistor, the first NMOS transistor, the second NMOS transistor, the third NMOS transistor, the fourth NMOS transistor, the fifth NMOS transistor, the sixth NMOS transistor, the seventh NMOS transistor and the eighth NMOS transistor; when a square signal is input to the first input terminal In0 of the switch unit, the square signal input to the first input terminal In0 of the switch unit is inverted and shaped by an inverter formed by the first PMOS transistor and the first NMOS transistor N1 to ensure that the square signal has a short rise time and a short fall time before reaching a delay unit formed by the second PMOS transistor and the second NMOS transistor N2; because the gates and sources of the second PMOS transistor and the second NMOS transistor form input terminals of the delay unit, the second PMOS transistor will be turned on and the second NMOS transistor N2 will be turned off when the square signal reaching the input terminals of the delay unit is a low level; because a threshold loss will be caused when the PMOS transistor transmits a low level, an output terminal of the delay unit, formed by the drains of the second PMOS transistor and the second NMOS transistor N2, cannot be quickly pulled down to a low level (VSS) and can only be pulled down to a threshold voltage of the second PMOS transistor; due to process deviations, the second PMOS transistor in each switch unit has a different threshold voltage, which makes the output terminal of the delay unit formed by the drains of the second PMOS transistor and the second NMOS transistor N2 in each switch unit be pulled down to a different level (voltage), finally leading to a different delay of the square signal in each switch unit; similarly, when the square signal reaching the input terminals of the delay unit is a high level, the second NMOS transistor N2 will be turned on, the second PMOS transistor will be turned off; because a threshold loss will be caused when the NMOS transistor transmits a high level, the output terminal of the delay unit, formed by the drains of the second PMOS transistor and the second NMOS transistor N2, cannot be quickly pulled up to a high level (supply voltage VDD) and can only be pulled up to a voltage obtained by subtracting a threshold voltage of the second NMOS transistor N2 from the supply voltage VDD; because of inevitable process deviations during the manufacturing process, the NMOS transistors have different threshold voltages, which makes the second NMOS transistor N2 in each switch unit have a different threshold voltage and the output terminal of the delay unit in each switch unit, formed by the drains of the second MPOS transistor and the second NMOS transistor N2, be pulled down to a different level (voltage), thus leading to a different delay of the square signal in each switch unit; then, the square signal output by the output terminal of the delay unit, formed by the drains of the second PMOS transistor and the second NMOS transistor N2, is transmitted by the third PMOS transistor and the third NMOS transistor N3; when the challenge signal input to the control terminal meets $C_i=0$, the third PMOS transistor is turned on, the third NMOS transistor is turned off, the square signal is transmitted to an input terminal of an inverter formed by the fourth PMOS transistor and the fourth NMOS transistor N4 through the third PMOS transistor and is inverted again by the inverter formed by the fourth PMOS transistor and the fourth NMOS transistor N4, and finally, a square signal identical with the square signal input to the first input terminal In0 is output by the first output terminal Out0 of the switch unit. On the contrary, when the challenge signal input to the control terminal meets $C_i=1$, the third PMOS transistor is turned off, the third NMOS transistor is turned on, the square signal is transmitted to an input terminal of an inverter formed by the eighth PMOS transistor and the eighth NMOS transistor N8 through the third NMOS transistor N3 and is inverted again by the inverter formed by the eighth PMOS transistor and the eighth NMOS transistor N8, and a square signal identical with the square signal input to the first input terminal In0 is output by the second output terminal Out1 of the switch unit. When a square signal is input to the second input terminal In1 of the switch unit, the square signal input to the second input terminal In1 of the switch unit is inverted and shaped by an inverter formed by the fifth PMOS transistor and the fifth NMOS transistor N5 to ensure that the square signal has a short rise time and a short fall time before reaching a delay unit formed by the sixth PMOS transistor and the sixth NMOS transistor N6; because the gates and sources of the sixth PMOS transistor and the sixth NMOS transistor form input terminals of the delay unit, the sixth PMOS transistor will be turned on and the sixth NMOS transistor N6 will be turned off when the square signal reaching the input terminals of the delay unit is a low level; because a threshold loss will be caused when the PMOS transistor transmits a low level, an output terminal of the delay unit, formed by the drains of the sixth PMOS transistor and the sixth NMOS transistor N6, cannot be quickly pulled down to a low level (VSS) and can only be pulled down to a threshold voltage of the sixth PMOS transistor; due to the process deviations, the sixth PMOS transistor in each switch unit has a different threshold voltage, which makes the output terminal of the delay unit formed by the drains of the sixth PMOS transistor and the sixth NMOS transistor N6 in each switch unit be pulled down to a different level (voltage), finally leading to a different delay of the square signal in each switch unit; similarly, when the square signal reaching the input terminals of the delay unit is a high level, the sixth NMOS transistor N6 will be turned on, the sixth PMOS transistor will be turned off, because a threshold loss will be caused when the NMOS transistor transmits a high level, the output terminal of the delay unit, formed by the drains of the sixth PMOS transistor and the sixth NMOS transistor N6, cannot be quickly pulled up to a high level (supply voltage VDD) and can only be pulled up to a voltage obtained by subtracting a threshold voltage of the sixth NMOS transistor N6 from the supply voltage VDD; because of inevitable process deviations during the manufacturing process, NMOS transistors have different threshold voltages, and the sixth NMOS transistor N6 in each switch unit has a different threshold voltage, which makes the output terminal of the delay unit in each switch unit, formed by the drains of the sixth MPOS transistor and the sixth NMOS transistor N6, be pulled down to a different voltage, thus leading to a different delay of the square signal in each switch unit; then, the square signal output by the output terminal of the delay unit, formed by the drains of the sixth PMOS transistor and the sixth NMOS transistor N6, is transmitted by the seventh PMOS transistor and the seventh NMOS transistor N7; when the challenge signal input to the control terminal meets $C_i=0$, the seventh PMOS transistor is turned on, the seventh NMOS transistor N7 is turned off, the square signal is transmitted to an input terminal of an inverter formed by the eighth PMOS transistor and the eighth NMOS transistor N8 through the seventh PMOS transistor and is inverted again by the inverter formed by the eighth PMOS transistor and the eighth NMOS transistor N8, and a square signal identical with the square signal input to the second input terminal In1 is output by the first output terminal Out0 of the switch unit. On the contrary, when the challenge signal input to the control terminal meets $C_i=1$, the seventh PMOS transistor is turned off, the seventh NMOS transistor N7 is turned on, the square signal is transmitted to an input terminal of an inverter formed by the fourth PMOS transistor and the fourth NMOS transistor N4 through the seventh NMOS transistor N7 and is inverted again by the inverter formed by the fourth PMOS transistor and the fourth NMOS transistor N4, and a square signal identical with the square signal input to the second input terminal In1 is output by the first output terminal Out0 of the switch unit. Through the sample structural design of the switch units, the strong PUF has a high capacity to resist machine learning attacks and small hardware expenditure, and can realize machine learning attack resistance and small hardware expenditure at the same time; and the two arbiters are used to realize dual-edge sampling, such that the strong PUF can generate a large number of challenge response pairs.

What is claimed is:

1. A machine learning attack resistant strong PUF with a dual-edge sampling function characterized in that comprises N switch units, wherein each switch unit has a first input terminal, a second input terminal, a control terminal, a first output terminal and a second output terminal; a challenge signal is input to the control terminal of each of the switch unit; each of the switch unit is able to transmit square signals input to the first input terminal and the second input terminal of each of the switch unit to the first output terminal and the second output terminal of each of the switch unit in parallel or in a crossed manner under the control of the challenge signal input to the control terminal of each of the switch unit and output the square signals by the first output terminal and the second output terminal of each of the switch unit; the first output terminal of the $n^{th}$ switch unit is connected to the first input terminal of the $(n+1)^{th}$ switch unit, the second output terminal of the $n^{th}$ switch unit is connected to the second input terminal of the $(n+1)^{th}$ switch unit, and n=1, 2, ..., N−1; the machine learning attack resistant strong PUF with a dual-edge sampling function further comprises two arbiters, which are referred to as a first arbiter and a second arbiter respectively, the first arbiter and the second arbiter each have a first input terminal, a second input terminal and an output terminal, the first output terminal of the $N^{th}$ switch unit is connected to the first input terminal of the first arbiter and the first input terminal of the second arbiter, the second output terminal of the $N^{th}$ switch unit is connected to the second input terminal of the first arbiter and the second input terminal of the second arbiter, the first arbiter is used for determining a sequential order of delays at a rising edge of signals input to the first input terminal and the second input terminal of the first arbiter and generating a corresponding signal which is output by the output terminal of the first arbiter, and the second arbiter is used for determining a sequential order of delays at a falling edge of signals input to the first input terminal and the second input terminal of the second arbiter and generating a corresponding signal which is output by the output terminal of the second arbiter; each switch unit comprises a first PMOS transistor, a second PMOS transistor, a third PMOS transistor, a fourth PMOS transistor, a fifth PMOS transistor, a sixth PMOS transistor, a seventh PMOS transistor, an eighth PMOS transistor, a first NMOS transistor, a second NMOS transistor, a third NMOS transistor, a fourth NMOS transistor, a fifth NMOS transistor, a sixth NMOS transistor, a seventh NMOS transistor and an eighth NMOS transistor, wherein a gate of the first PMOS transistor and a gate of the first NMOS transistor are connected, and a connecting terminal is the first input terminal In0 of the switch unit; a supply voltage VDD is accessed to a source of the first PMOS transistor, a source of the fourth PMOS transistor, a source of the fifth PMOS transistor and a source of the eighth PMOS transistor; a drain of the first PMOS transistor, a drain of the first NMOS transistor, a gate of the second PMOS transistor, a source of the second PMOS transistor, a gate of the second NMOS transistor and a source of the second NMOS transistor are connected; a drain of the second PMOS transistor, a drain of the second NMOS transistor, a source of the third PMOS transistor and a source of the third NMOS transistor are connected; a gate of the third PMOS transistor, a gate of the third NMOS transistor, a gate of the seventh PMOS transistor and a gate of the seventh NMOS transistor are connected, and a connecting terminal is the control terminal $C_i$ of the switch unit; a drain of the third PMOS transistor, a drain of the seventh NMOS transistor, a gate of the fourth PMOS transistor and a gate of the fourth NMOS transistor are connected; a drain of the third NMOS transistor, a drain of the seventh PMOS transistor, a gate of the eighth NMOS transistor and a gate of the eighth PMOS transistor are connected; a drain of the fourth PMOS transistor and a drain of the fourth NMOS transistor are connected, and a connecting terminal is the first output terminal Out0 of the switch unit; a source of the first NMOS transistor, a source of the fourth NMOS transistor, a source of the fifth NMOS transistor and a source of the eighth NMOS transistor are all grounded; a gate of the fifth PMOS transistor and a gate of the fifth NMOS transistor are connected, and a connecting terminal is the second input terminal In1 of the switch unit; a drain of the fifth PMOS transistor, a drain of the fifth NMOS transistor, a gate of the sixth PMOS transistor, a drain of the sixth PMOS transistor, a gate of the sixth NMOS transistor and a source of the sixth NMOS transistor are connected; a drain of the sixth PMOS transistor, a drain of the sixth NMOS transistor, a source of the seventh PMOS transistor and a source of the seventh NMOS transistor are connected; and a drain of the eighth PMOS transistor and a drain of the eighth NMOS transistor are connected, and a connecting terminal is the second output terminal Out1 of the switch unit.

2. The machine learning attack resistant strong PUF with a dual-edge sampling function according to claim 1, wherein the first arbiter comprises a first two-input NAND gate and a second two-input NAND gate, wherein the first two-input NAND gate and the second two-input NAND gate each have a first input terminal, a second input terminal and an output terminal; the first input terminal of the first two-input NAND gate is the first input terminal of the first arbiter, the output terminal of the first two-input NAND gate is connected to the first input terminal of the second two-input NAND gate, the second input terminal of the second two-input NAND gate is the second input terminal of the first arbiter, the second input terminal of the first two-input NAND gate is connected to the output terminal of the second two-input NAND gate, and a connecting terminal is the output terminal of the second arbiter; the second arbiter comprises a first two-input NOR gate and a second two-input NOR gate, wherein the first two-input NOR gate and the second two-input NOR gate each have a first input terminal, a second input terminal and an output terminal, the first input terminal of the first two-input NOR gate is the first input terminal of the second arbiter, the output terminal of the first two-input NOR gate is connected to the first input terminal of the second two-input NOR gate, the second input terminal of the second two-input NOR gate is the second input terminal of the second arbiter, and the second input terminal of the first two-input NOR gate is connected to the output terminal of the second two-input NOR gate, and a connecting terminal is the output terminal of the second arbiter.

* * * * *